United States Patent
Westfield

(10) Patent No.: US 6,470,390 B1
(45) Date of Patent: Oct. 22, 2002

(54) METHOD AND APPARATUS FOR A DUAL CONNECTION COMMUNICATION SESSION

(75) Inventor: William E Westfield, Atherton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/342,864

(22) Filed: Jun. 29, 1999

(51) Int. Cl.[7] .......................... G06F 13/00; G06F 9/455
(52) U.S. Cl. ...................... 709/227; 370/438; 370/439; 703/23
(58) Field of Search ................................ 709/227, 228, 709/230; 703/23; 370/439, 438, 431

(56) References Cited

U.S. PATENT DOCUMENTS

| | | | | |
|---|---|---|---|---|
| 5,325,361 A | * | 6/1994 | Lederer et al. | 370/401 |
| 5,754,830 A | * | 5/1998 | Butts et al. | 709/311 |
| 6,115,040 A | * | 9/2000 | Bladow et al. | 345/741 |
| 6,167,450 A | * | 12/2000 | Angwin et al. | 709/227 |
| 6,233,541 B1 | * | 5/2001 | Butts et al. | 703/27 |
| 6,243,752 B1 | * | 6/2001 | Butt | 709/227 |
| 6,295,075 B1 | * | 9/2001 | Janay et al. | 345/747 |

FOREIGN PATENT DOCUMENTS

WO    WO 97/10665    * 3/1997

OTHER PUBLICATIONS

Postel, J. and J. Reynolds, *RFC854 Telnet Protocol Specification*, www.faqs.org, May 1983, 14 pages.
Postal., J. and J. Reynolds. *File Transfer Protocol (FTP)*, RFC959, Oct. 1985, 53 pages.

* cited by examiner

Primary Examiner—Kenneth R. Coulter
(74) *Attorney, Agent, or Firm*—Innovation Partners; Charles E. Gotlieb

(57) ABSTRACT

A method and apparatus establishes a connection for a communication session between two remote devices, then negotiates an additional connection. One of the connections is used to communicate data, not commands, allowing that connection to be more efficient because each remote device does not have to scan it for commands in the information it receives.

27 Claims, 3 Drawing Sheets

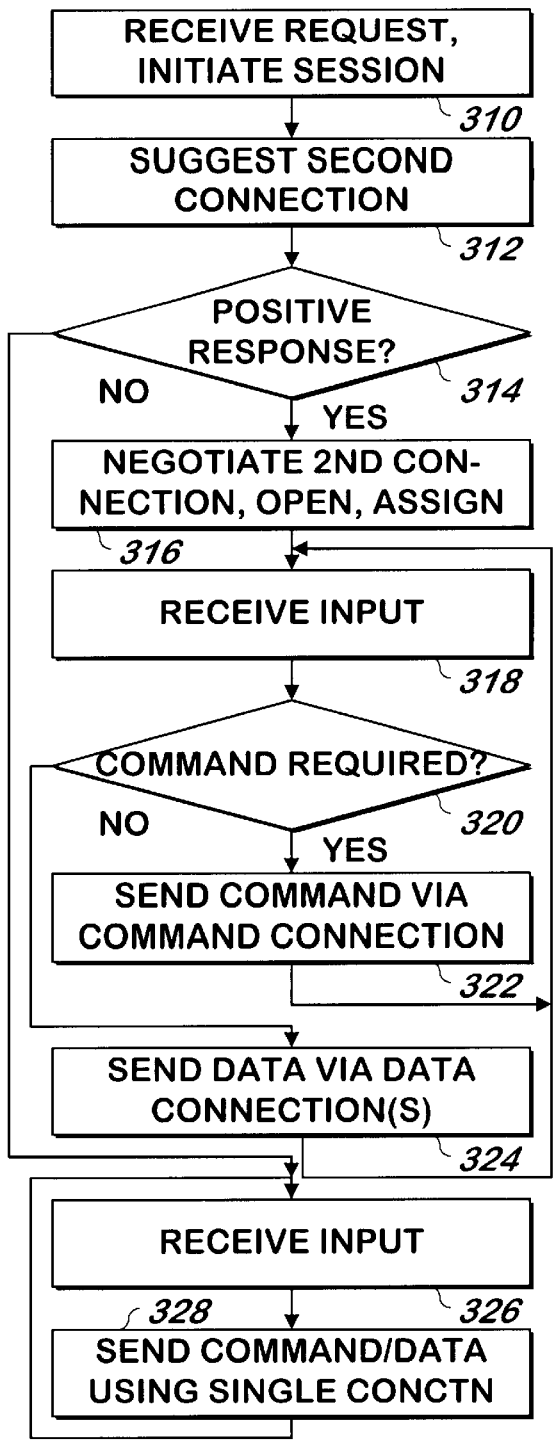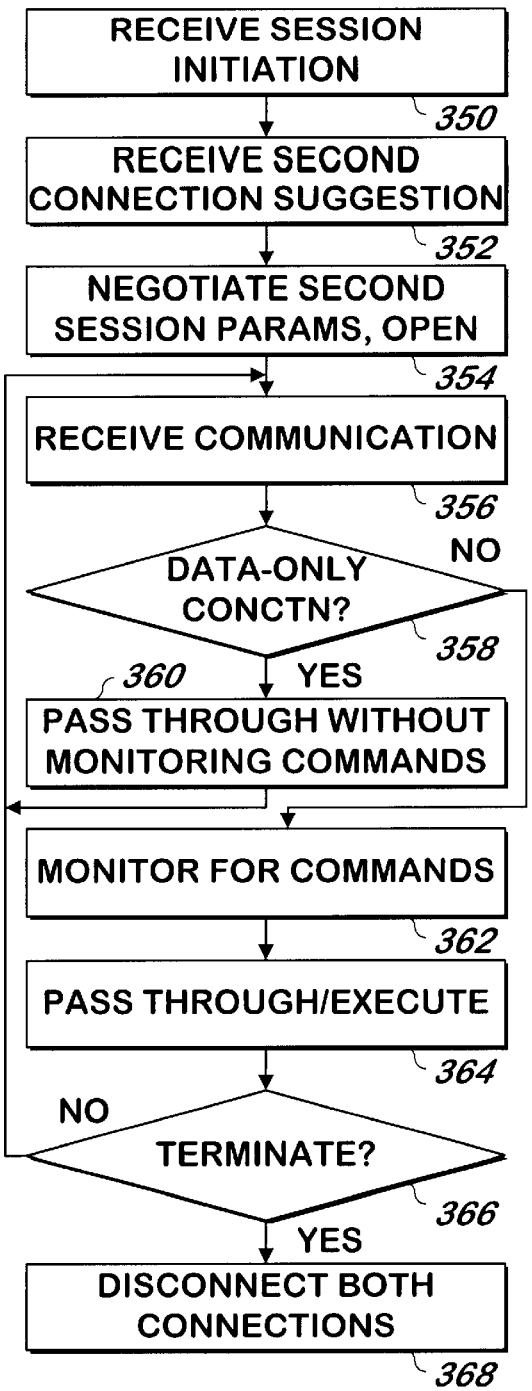
FIG. 3A
FIG. 3B

METHOD AND APPARATUS FOR A DUAL CONNECTION COMMUNICATION SESSION

FIELD OF THE INVENTION

The present invention is related to computer software and more specifically to computer software for Internet Protocol communications.

BACKGROUND OF THE INVENTION

To communicate across a network, a communications protocol may be used. One such communication protocol that is widely used is the TELNET protocol, referred to herein as TELNET. TELNET is described in RFC 854, submitted under an information disclosure statement in this case and available at the website of faqs.org. The Telnet protocol can be used to access a host computer on a network different from that of the user of the protocol. TELNET establishes the session with the host, and then provides terminal emulation for the user of the protocol to allow the communication from the user to appear to the host as a local terminal. This type of session is known as a "terminal emulation communications session." TELNET terminates the terminal emulation communications session when the user so requests or the host so requests.

A TELNET session uses software in two locations, at the user side and at the host side of the connection. The software at both locations sets up and tears down the connection using control commands between the two locations, and passes data from one location to the other. Other control commands perform other functions.

Because TELNET and other similar protocols allow data and control commands to be sent over the same connection, the recipient of any information must constantly scan it to identify whether the information is a control command or data that is merely passed on to the host or the user after formatting or other conversion,,such as ASCII to EBCDIC. Scanning to separate commands from data takes processor resources to perform. Because most information passed between the two locations is data and not commands, the processor resources required to identify whether information received is a command or data makes the TELNET protocol and other similar protocols processor inefficient. What is needed is a method and apparatus that can improve efficiency in a terminal emulation communications session.

SUMMARY OF INVENTION

A method and apparatus uses a conventional protocol to establish a conventional communication session between two remote devices using a single connection. An enhanced version of the protocol allows one of the devices to suggest an additional connection to the other device. If the other device responds affirmatively to the suggestion, the devices can negotiate the additional connection. One of the two connections can be used to send only data and the other can be used either for commands, or for commands and data. Freed from the requirement to monitor the data-only connection for commands, each device can communicate data more-efficiently.

BRIEF DESCRIPTION OF THE DRAWINGS

FIG. 3A is a flowchart illustrating a method of arranging a terminal emulation communications session according to one embodiment of the present invention.

FIG. 3B is a flowchart illustrating a method of arranging a terminal emulation communications session according to another embodiment of the present invention.

DETAILED DESCRIPTION OF A PREFERRED EMBODIMENT

Figure 1:
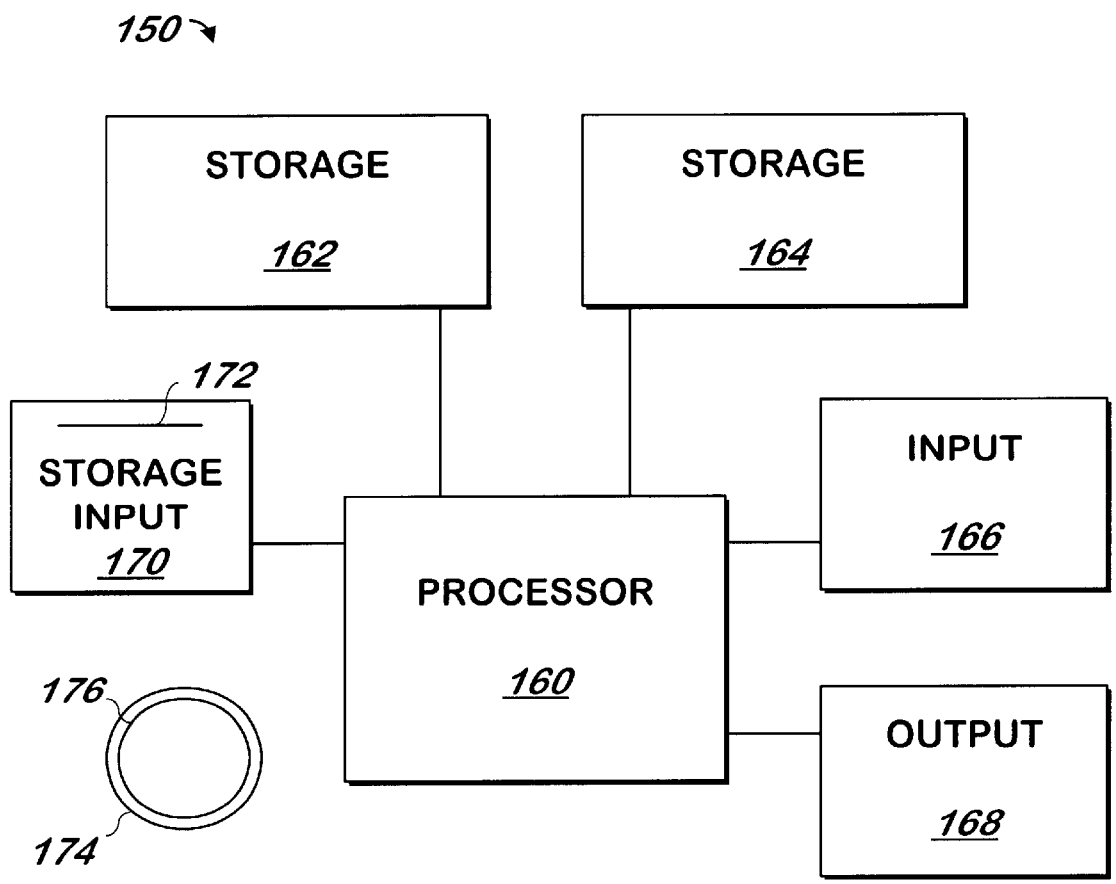
FIG. 1 is a block schematic diagram of a conventional computer system.

The present invention may be implemented as computer software on one or more conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Mountain View, Calif., although other systems may be used. In another embodiment, each computer system is a conventional communications switch or a router such as the model 2511 router commercially available from Cisco Systems of San Jose, Calif.

Figure 2:
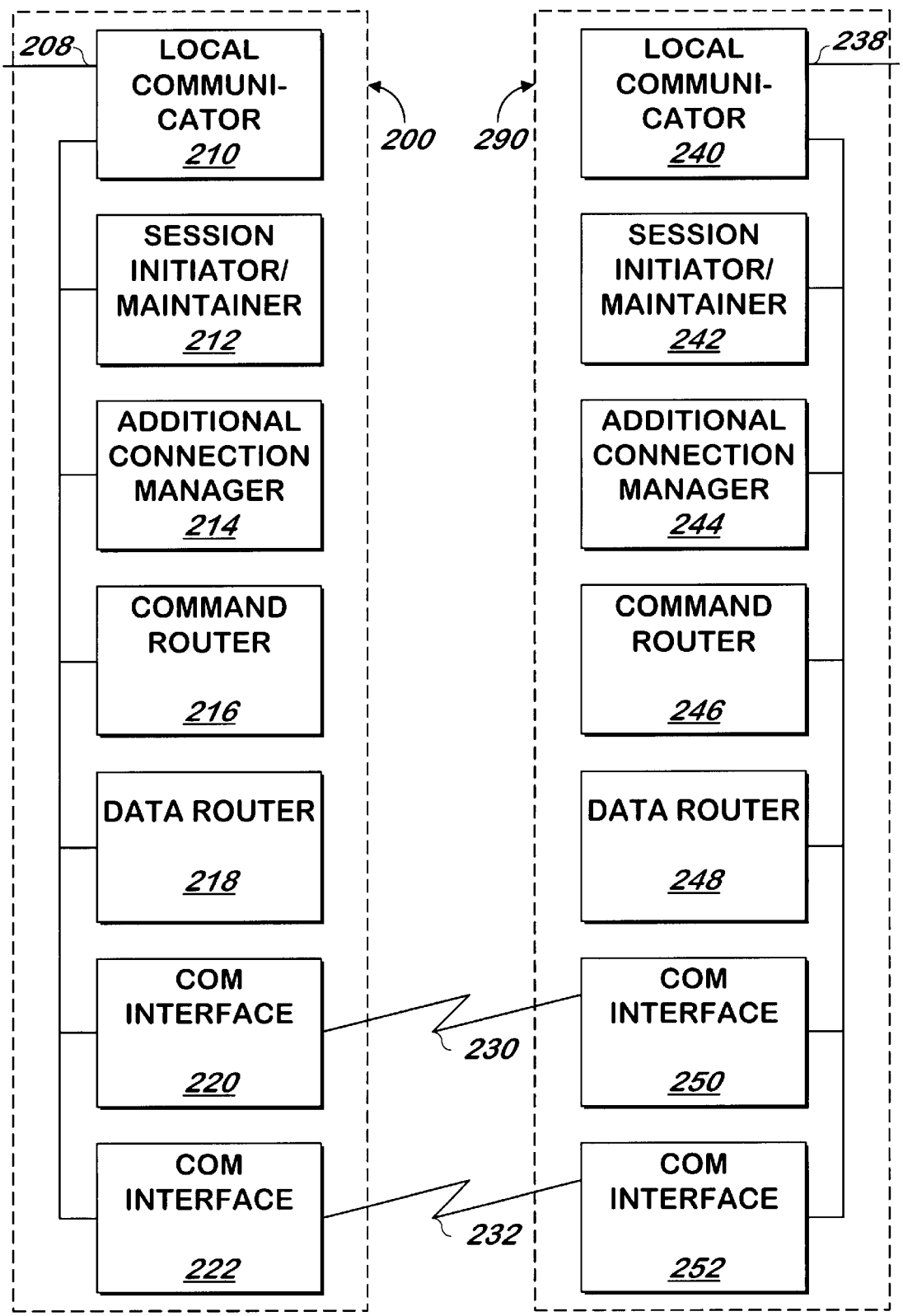
FIG. 2 is a block schematic diagram of an apparatus for arranging a terminal emulation communications session according to one embodiment of the present invention.

Referring now to FIG. 2, a system for arranging a terminal emulation communications session between two remote devices 200, 290 is shown according to one embodiment of the present invention. Each of the devices 200, 290 is remote from one another.

Local communication 210 receives commands and data from the user at input/output 208. If thee command is a command to establish a TELNET session, local communicator 210 signals session initiator/maintainer 212. Session initiator/maintainer 212 is an apparatus that generates commands to initiate a conventional TELNET or other terminal emulation communications session with a remote device, and then provides any additional commands to maintain or terminate the session. Session initiator/maintainer 212 use s communications interface 220 to set up a conventional terminal emulation communications session with a remote device 290, such as by using the TELNET protocol or other protocol. In one embodiment, the communication session uses the TELNET protocol, although other communications protocols may be used. The TELNET protocol is used herein-for purposes of example.

Two communications interfaces 220, 222 in the device 200 are shown in the FIG. However, in one embodiment, there may be many interfaces similar to communications interfaces 220, 222 from which session initiator/maintainer 212 may choose to arrange the session. In one embodiment, session initiator/maintainer 212 chooses the fastest available communications interface 220 from among those available.

The conventional communications session is set up from the originating device 200 to the receiving answering device 290 using communications connection 230, which can be a conventional LAN or a dial-up connection. Once session initiator/maintainer 212 has initiated a session, a conventional terminal emulation communications session is fully established, and can be used as if it were any conventional terminal emulation communications session, for example, a conventional TELNET session.

Once the session is established, session initiator/maintainer 212 signals additional connection manager 214. Additional connection manager 214 uses the session established as described above to suggest an additional connection to the answering device 290. In one embodiment, additional connection manager 214 performs this function by sending a code for a "do open data stream" control command. In one embodiment, this control command has a code that is unused by the conventional TELNET protocol control commands so that if the software at the host location does not support an additional connection, the software at the answering device 290 will not confuse the do open data stream control command with another control command. Ideally, the code for the do open data stream command should be in a format that allows the host to determine that the command is an unknown command and not data it should send to the host.

It is noted that in the embodiment described herein, the additional connection is suggested by the originating location 200. In another embodiment, the additional connection is suggested by the answering location 290 by the counterpart of additional connection manager 214 in the remote device 290.

If the recipient of the suggestion does not have the capability to use the additional connection, either the recipient will not respond to the suggestion or the recipient will not respond affirmatively. If the recipient of the suggestion does have such a capability, it may respond affirmatively using the original connection 230. Communications interface 220 will provide any such response to additional connection manager 214, or it may be provided to session initiator 212, which provides it to additional connection manager 214.

If the response to the suggestion is affirmative, additional connection manager 214, will negotiate the connection-to use with the answering device 290 as described in more detail below. In one embodiment, this is performed by additional connection manager 214 suggesting a connection endpoint identifier, such as a port/socket number over which the additional connection will be made. If the recipient agrees with the suggestion of the connection endpoint identifier, it can respond affirmatively, otherwise it responds negatively and additional connection manager 214 suggests another connection endpoint identifier.

If the additional connection is agreed upon as described above, additional connection manager 214 may signal communications interface 222 with the agreed upon connection endpoint identifier. Communications interface 222 opens the second communications connection 232 to the answering device 290. The additional connection 232 may be physically separate from the original connection 230, or the additional connection 232 may be a separate logical connection on the same physical facility as connection 230. Communication interfaces 220, 222 may similarly be the same interface using two different logical communications paths.

Additional connection manager 214 signals command router 216 and data router 218, which serve to route to one of the two connections 230, 232 established, subsequent commands and data, respectively. Additional connection manager 214 provides them 216, 218 with identifiers of the connection or connections to use for control commands and for data.

If no additional connection is established, the identifiers of the connection additional connection manager 214 provides command router 216 and data router 218 are the identifiers of connection 230. If an additional connection is established, the identifiers of connection 230 may be provided to command router 216 and the identifiers of connection 232 may be provided to data router 218. In one embodiment, the identifier of a connection 230, 232 is an identifier of the interface 220, 222 that supports that connection 230, 232.

In one embodiment, local communicator 210 sends all data to data router 218 for routing over a particular connection 230, 232 as described in more detail below. If the user performs an action that causes a command to be sent, local communicator 210 signals session initiator/maintainer, which sends the appropriate command to command router 216. In one embodiment, commands may be generated for reasons other than user actions. These commands are also generated by session-initiator/maintainer 212 and provided to command router 216 for routing as described below.

Command router 216 will use the identifier of the connection it receives from additional connection manager 214 to send control commands over connection 230. Similarly, data router 218 uses the identifiers to send data over connection 232.

In addition to sending data from the user and commands, device 200 may receive data and commands from device 290. Data-received over the connection 230 having the identifier provided to command router 216.by additional connection manager 214 is scanned for commands by command router 216. Command router 216 provides these received commands to session initiator/maintainer 212 for execution in the conventional manner. If the command is a command to terminate the session, session initiator/maintainer 212 signals command router 216 and data router 218,, which signals the communication interfaces 220, 222 to disconnect the connection. Data received by data router 218 from communications interface 222 is provided to local communicator 210 without scanning it for commands.

In one embodiment, data router 218 can receive from additional connection manager 214 identifiers of two connections 230, 232. Additional connection manager 214 provides to data router 218 the identifier of both connections 230, 232 and provides the identifier of only one connection to command router 216. This embodiment may be implemented in circumstances where commands are only infrequently transmitted. In such embodiment, both connections 230, 232 may be used to send and receive data, but the recipient need only scan one of the connections 230 for commands. In such embodiment, throughput may be improved in this manner while still achieving the efficiency benefits on the connection 232 that does not send commands. In such embodiment, command router 216 would send any data it receives from communications interface 220 to local communicator 210. Local communicator 210 would then reassemble the data from both connections 230, 232 into the original message, for example by using conventional packet reassembly techniques.

It may simplify the implementation to use the first connection 230 established as the connection that will carry the commands if the data stream for that connection 230 is already being scanned for commands. The data stream will be scanned if the conventional protocol used to begin the communications session between the two devices 200, 290 implements such scanning. It is possible, however, to discontinue the scanning from the original connection 230 and scan the second connection 232 for commands if desired.

As described herein, two connections are used for the communication session. However, more than two connections may be used according to the present invention as long as the number of connections used to send commands is less than the number of connections in the session.

The apparatus at the answering device 290 may be an exact duplicate of the apparatus of the originating device 200. However, the answering device will have the ability to either suggest the additional connection as described above or to receive and respond to the suggestion for the additional connection. Such response capability is described in more detail below. In one embodiment, both devices 200, 290 have all capabilities described in the other 290, 200, although unneeded capabilities may be omitted if desired. For example, if one device 290 will never originate a session, and the originating device 200 is the device that sends the suggestion for the additional connection, the device 290 that will only receive need not be capable of sending the suggestion. For the purposes of illustration, it is assumed that the similarly named components, 210, 212, 214, 216, 218, 220, 222 have all of the functions described in components 240, 242, 244, 246, 248, 250, 252, respectively, and vice versa.

When the receiving device 290 receives the connection initiation signal at communications interface 250, communications interface 250 signals session initiator/maintainer 242. Session initiator/maintainer 242 sets up the connection and negotiates the protocol using conventional methods.

Session initiator/maintainer 242 signals local communicator 240. Local communicator 240 initiates a session with a host computer coupled to input/output 238, for example by generating and providing a input/output 238 a conventional log on sequence for the host. Local communicator 240 performs any necessary translation or formatting required for terminal emulation Using conventional techniques.

If session initiator/maintainer 242 supports the, capability to add a second connection, when session initiator/maintainer 242 receives the suggestion to initiate a second connection as described above, session initiator/maintainer 242 signals additional connection manager 244.

Additional connection manager 244 negotiates the additional connection by providing or receiving identifiers of an additional communication interface 252 that should be contacted for use as a second connection 232 by the originating device 200. Alternately, the originating device 200 sends information about setting up the second connection 232 to the additional connection manager 244 and additional connection manager 244 signals communication interface 252 to establish the second connection using this information.

Additional connection manager 244 provides identifiers of the communication interfaces 250, 252 to command router 246 and data router 248 to describe over which connection 230 or connections 230, 232 the data will arrive from the remote device 200 and which connection 232 the commands will arrive from the remote device 200. Data and commands to be sent to the remote device 200 are sent using the appropriate data or command connection or connections. As described above, one or two connections may be used to send the data. In one embodiment, the first connection 230 is always used for commands and data and any additional connection 232 or connections are used for data only. However, instead of implying the type of information that a particular connection 230, 232 will carry, the additional connection managers 242, 212 may negotiate the type of information each connection 230, 232 will carry.

Local communicator 240 passes the data it receives from command router 246 or data router 248 to input/output 238, which may be connected to a host. Local communicator 240 performs any protocol translation to the host, for example by emulating a terminal connected to the host. In one embodiment, if two connections will be used for data transmission as described above, additional connection manager 244 signals local communicator 240 when the additional connection is established. Local communicator 240 can then reassemble the data from the two routers 246, 248 to a single data stream, such as by using packet identifiers or other conventional methods.

Referring now to FIG. 3A, a method of arranging a terminal emulation communications session is shown according to one embodiment of the present invention. A request to arrange a terminal emulation communications session is received 310. The request may be received from a user or other source. In one embodiment, the request is a conventional TELNET request, but other communication protocols may be used in other embodiments. A session such as a conventional TELNET session is initiated 310, using conventional communication session initiation commands. In one embodiment, the session initiation of step 310 includes conventional parameter negotiation such as line speed, flow control and other parameters.

A second connection is suggested 312. If a positive response to the suggestion of step 312 is received 314, the connection parameters for the second connection may be negotiated 316 using conventional negotiation or other techniques. The connection is then opened 316 using conventional techniques. The connections are assigned 316 as either a data connection or a command connection or both as described above.

An input is received 318, for example from a user. If the input requires a command to be sent 320, the command is generated if necessary and sent 322 over the connection assigned as the command connection in step 316. If the input received in step 318 does not require a command to be sent 320, the input is data, and it is sent 324 via the data connection or one of the data connections assigned in step 316 as described above. In one embodiment, commands may be generated and sent without receiving any input and in such embodiment, those commands are sent over the command connection.

If no positive response to the suggestion of step 312 is received 314, inputs may be received 326 and commands and data are transmitted 328 over the same connection according to conventional methods.

Referring now to FIG. 3B, a method of arranging a communication session is shown according to one embodiment of the present invention. In one embodiment, the method of FIG. 3A is performed by an originator of the session and the method of FIG. 3B is performed by the answering party of the session.

A session initiation message is received 350. In one embodiment, step 350 includes conventional protocol and/or parameter negotiation. The protocol of step 350 may be the conventional TELNET protocol or another protocol. In one embodiment, step 350 includes logging onto a host following receipt of the session initiation message.

An additional connection suggestion is received 352 and the protocol or parameters or both are negotiated 354 for the second session. In an alternate embodiment of the present invention, the second connection suggestion of step 352 is sent rather than received. In one embodiment, step 354 or 352 includes negotiation or determination and transmission or receipt of whether a connection will be used to communicate data, commands or both. As part of step 354, the connections may be assigned to data, commands or both as described above, as long as one of the connections is assigned as a data-only connection. The additional connection is opened as part of step 354 after the negotiation is completed.

A communication is received 356 over one of the two connections. If the communication is received over the data only connection 358, the communication is passed through 360 as data without monitoring the communication for one or more commands. Otherwise, the communication is monitored 362 to determine whether the communication is a command. If the communication is not a command, it is passed through, for example to a receiving device, and if the communication is a command it is executed 364. Step 364 may include conventional translation or formatting as described above. If a termination command is received 366, both connections are terminated 368. Steps 366, 368 may be implemented in FIG. 3A as well.

What is claimed is:

1. A method of arranging a terminal emulation communications session with a remote device, the terminal emulation communications session comprising information, the method comprising:
   arranging a first connection with the remote device to carry a first portion of the communication session information;
   suggesting a second connection to the remote device;
   responsive to receipt of a positive response to the suggesting step, arranging a second connection with the remote device to carry a second portion of the terminal emulation communications session information; and
   and at least substantially all commands for the terminal emulation communications session that are generated for reasons other than user actions are carried by one of the first connection and the second connection after such first and second connections have been established.

2. The method of claim 1, wherein the information of the terminal emulation communications session comprises data and at least one command, the method additionally comprising:
   communicating the at least one command on one selected from the first connection and the second connection; and
   communicating the data on at least one selected from the first connection and the second connection.

3. The method of claim 1, wherein the arranging step comprises using a protocol.

4. The method of claim 3, wherein the protocol is TELNET.

5. An apparatus for establishing a terminal emulation communications session with a remote device, the apparatus comprising:
   a first communication interface having a first input/output coupled to the remote device and a second input/output, the first communication interface for providing information received at the first input/output to the second input/output and for providing information received at the second input/output to the first input/output;
   a session initiator/maintainer having an-input/output coupled to the first communication interface second input/output, the session initiator/maintainer for arranging via the session initiator input/output a first connection with the remote device and for providing at a session initiator/maintainer output a signal responsive to the arrangement of the first connection; and
   an additional connection manager having an input coupled to the session initiator/maintainer output for receiving the signal and a first input/output coupled to the first communication interface second input/output, the additional connection manager for providing at the additional connection manager first input/output a request for a second connection with the remote device, different from the first connection, responsive to the signal received at the additional connection manager input; and
   wherein the first connection and the second connection are for carrying information related to the terminal emulation communications session and at least substantially all commands for the terminal emulation communications session that are generated for reasons other than user actions are carried by one of the first connection and the second connection after such first and second connections have been established.

6. The apparatus of claim 5, additionally comprising:
   a second communication interface having a first input/output coupled to the remote device and a second input/output, the second communication interface for providing information received at the second communication interface first input/output to the second communication interface second input/output and for providing information received-at the second communication interface second input/output to the second communication interface first input/output; and
   a command router having an input operatively coupled to receive a first set of commands, said first set of commands unrelated to establishing and disconnecting the first connection and the second connection, the command router for providing to one selected from the first communication interface and the second communication interface the first set of commands at an output coupled to the one selected from the first communication interface and the second communication interface.

7. The apparatus of claim 6, additionally comprising a data router having an input operatively coupled for receiving data from a user, the data router for providing the data received at the input at an output coupled to at least one of the first communication interface second input/output and the second communication interface second input/output to which the first set of commands is not provided.

8. The apparatus of claim 7, wherein the data router output is coupled to both of the first communication interface second input/output and the second communication interface second input/output.

9. The apparatus of claim 5, wherein the session initiator/maintainer arranges the first connection using a protocol.

10. The apparatus of claim 5, wherein the protocol is TELNET.

11. An apparatus for establishing a terminal emulation communications session with a remote device, the apparatus comprising:
- a first communication interface having a first input/output coupled to the remote device and a second input/output, the first communication interface for providing information received at the first input/output to the second input/output and for providing information received at the second input/output to the first input/output;
- a session initiator/maintainer having an input/output coupled to the first communication interface second input/output, the session initiator for arranging via the session initiator/maintainer input/output a first connection with the remote device; and
- an additional connection manager having an input/output coupled to the first communication interface second input output, the additional connection manager for arranging via the additional connection manager input/output a second connection, separate from the first connection, with the remote device; and
- wherein the first connection and the second connection are for carrying information related to the terminal emulation communications session and at least substantially all commands for the terminal emulation communications session that are generated for reasons other than user actions are carried by one of the first connection and the second connection after such first and second connections have been established.

12. The apparatus of claim 11, wherein at least one selected from the first connection and the second connection communicates at least one command and at least one selected from the first connection and the second connection communicates data.

13. The apparatus of claim 11, wherein the session initiator/maintainer arranges the first communications session using a protocol.

14. The apparatus of claim 13, wherein the protocol is TELNET.

15. The apparatus of claim 11, wherein the additional connection manager arranges the second connection after the session initiator arranges the first connection.

16. A method of arranging a terminal emulation communications session with a remote device, the communication session comprising data, the method comprising:
- arranging a first connection with the remote device;
- receiving a suggestion to arrange a second connection with the remote device;
- responsive to the suggestion received, arranging a second connection with the remote device; and
- wherein the first connection is for communicating a first portion of the information of the terminal emulation communications session and the second session is for communicating a second portion of the information of the terminal emulation communications session and at least substantially all commands for the terminal emulation communications session that are generated for reasons other than user actions are carried by one of the first connection and the second connection after such first and second connections have been established.

17. The method of claim 16, additionally comprising:
- monitoring one selected from the first connection and the second connection to detect the presence of at least one command; and
- passing information from one selected from the first connection and the second connection and different from the connection monitored to a digital device without monitoring, said selected connection for at least one command.

18. The method of claim 17 wherein the arranging the first connection step comprises communicating using a protocol.

19. The method of claim 18 wherein the protocol is TELNET.

20. A computer program product comprising a computer useable medium having computer readable program code embodied therein for arranging a terminal emulation communications session with a remote device, the terminal emulation communications session comprising information, the computer program product comprising:
- computer readable program code devices configured to cause a computer to arrange a first connection with the remote device to carry a first portion of the communication session information;
- computer readable program code devices configured to cause a computer to suggest a second connection to the remote device;
- computer readable program code devices configured to cause a computer to, responsive to receipt of a positive response to the computer readable program code devices configured to cause a computer to suggest, arrange a second connection with the remote device to carry a second portion of the terminal emulation communications session information; and
- wherein at least substantially all commands for the terminal emulation communications session that are generated for reasons other that user actions are carried by one of the first connection and the second connection after such first and second connections have been established.

21. The computer program product of claim 20 wherein the information of the terminal emulation communications session comprises data and at least one command, the computer program product additionally comprising:
- computer readable program code devices configured to cause a computer to communicate the at least one command on one selected from the first connection and the second connection; and
- computer readable program code devices configured to cause a computer to communicate the data on at least one selected from the first connection and the second connection.

22. The computer program product of claim 20, wherein the computer readable program code devices configured to cause a computer to arrange comprise computer readable program code devices configured to cause a computer to use a protocol.

23. The computer program product of claim 22 wherein the protocol is TELNET.

24. A computer program product comprising a computer useable medium having computer readable program code embodied therein for arranging a terminal emulation communications session with a remote device, the communication session comprising data, the computer program product comprising:
- computer readable program code devices configured to cause a computer to arrange a first connection with the remote device;
- computer readable program code devices configured to cause a computer to receive a suggestion to arrange a second connection with the remote device;

computer readable program code devices configured to cause a computer to, responsive to the suggestion received, arranging a second connection with the remote device; and wherein the first connection is for communicating a first portion of the information of the terminal emulation communications session and the second session is for communicating a second portion of the information of the terminal emulation communications session and at least substantially all commands for the terminal emulation communications session that are generated for reasons other than user actions are carried by one of the first connection and the second connection after such first and second connections have been established.

25. The computer program product of claim 24, additionally comprising:

computer readable program code devices configured to cause a computer to monitor one selected from the first connection and the second connection to detect the presence of at least one command; and computer readable program code devices configured to cause a computer to pass information from one selected from the first connection and the second connection and different from the connection monitored to a digital device without monitoring said selected connection for at least one command.

26. The computer program product of claim 25 wherein the computer readable program code devices configured to cause a computer to arrange the first connection comprise computer readable program code devices configured to cause a computer to communicate using a protocol.

27. The computer program product of claim 26 wherein the protocol is TELNET.

* * * * *